United States Patent [19]

Podschus

[11] 4,010,234
[45] Mar. 1, 1977

[54] PRODUCTION OF HIGHLY POROUS ACTIVE ALUMINIUM OXIDE GRANULATE

[75] Inventor: Ernst Podschus, Leverkusen, Germany

[73] Assignee: Bayer Aktiengesellschaft, Leverkusen, Germany

[22] Filed: Aug. 12, 1975

[21] Appl. No.: 604,014

[30] Foreign Application Priority Data

Aug. 17, 1974 Germany .......................... 2439543

[52] U.S. Cl. ................................ 264/117; 264/122
[51] Int. Cl.$^2$ ............................................. B01J 2/00
[58] Field of Search .................... 264/117, 122, 115

[56] References Cited

UNITED STATES PATENTS

| 3,760,050 | 9/1973 | Blaker et al. | 264/117 |
| 3,795,724 | 3/1974 | Paul et al. | 264/117 |

*Primary Examiner*—Robert F. White
*Assistant Examiner*—James R. Hall
*Attorney, Agent, or Firm*—Connolly and Hutz

[57] ABSTRACT

A process for producing active aluminum oxide granulate of high porosity which comprises mixing finely ground aluminum oxide powder with at least one finely ground additive selected from the group consisting of water-soluble salts and non-ionic substances which do not react with aluminum oxide, are not hygroscopic at room temperature and below about 60% relative humidity and do not undergo any phase transformation at temperatures of up to about 100° C. in a ratio by weight of aluminum oxide to additive of from about 90:10 to 30:70, granulating the mixture in the presence of water, ageing the granulate for at least 5 hours at 50° to 100° C., washing out water-soluble additive, drying and activating the granulate at a temperature of from 200° to 500° C.

2 Claims, No Drawings

PRODUCTION OF HIGHLY POROUS ACTIVE ALUMINIUM OXIDE GRANULATE

It is known to produce highly active aluminum oxide in granulate form by partially dehydrating alumina hydrate, grinding the active oxide, granulating the product thus obtained in the presence of water, followed by reactivation, the partial dehydration step being carried out in less than one second with unground, standard commercial-grade alumina trihydrate in a highly turbulent hot gas stream having a temperature of 500° to 1200° C. The highly active aluminium oxide shows the highly distorted crystal structure of Chi-$Al_2O_3$ with a specific surface according to BET of more than 300 $m^2/g$, preferably more than 330 $m^2/g$, a residual water content of from 2% to 15%, preferably 3% to 12% and a water uptake capacity at 50% relative humidity of more than 15%. This highly active aluminium oxide is ground until the residue on a 40$\mu$ screen amounts to less than 20%, after which the ground product is granulated in the presence of water, the granules are stored in moist form for a least 10 hours and then dried and activated in a dry inert gas stream at from 200° to 500° C. In cases where they are produced by so-called rolling granulation in the form of beads, for example 3 to 5 mm in diameter, the active aluminium oxide granulates obtained by this process have a specific BET surface of from 300 to 450 $m^2/g$, a breakage resistance equivalent to about 15 to 30 kg and a total pore volume of 40 to 50 cc/100 g. A higher pore volume is required for various applications, for example for catalysts and catalyst supports which are impregnated with solutions of catalytically active substances. In order to achieve this, it has already been proposed to add organic substances to the granulate and subsequently to burn off the organic substances. Apart from the complexity of this process, the elevated temperatures which it requires results in a reduction in the specific surface of the granulates which adversely affects their quality.

It has now been found that the pore volume of the granulate can be considerably increased (beyond 50 cc/100 g to about 100 cc/100 g) in a relatively simple manner without any significant effect upon the remaining properties of the granulate, providing completely water-soluble salts and/or non-ionic substances which do not react with $Al_2O_3$, which are not hygroscopic at room temperature and below about 60% relative humidity and do not undergo any phase transformation at temperatures of up to about 100° C, are added in finely ground, dry form to the finely ground active aluminum oxide powder before it is granulated in ratios by weight of from about 90 parts by weight of $Al_2O_3$: 10 parts of the additive to 30 parts by weight of $Al_2O_3$: 70 parts of the additive, the mixture is granulated in the usual way in the presence of water, the moist granulate is allowed to age for at least 5 hours preferably at 50° to 100° C and the water-soluble additive is subsequently washed out, and the steps are followed by activation in a dry gas stream at 200° to 500° C and preferably at 300° to 400° C.

Activation may be followed by heat treatment at higher temperatures where a reduction in the specific surface and phase transformation of the $Al_2O_3$, for example into the $\gamma$- or $\alpha$-form, are required for the use of the granulate as a catalyst support.

The water-soluble salts may be, for example, ammonium halides; the alkali metal halides such as NaCl, KCl, NaBr, KBr; nitrates of alkali metal halides and mixtues thereof. Urea and sugar are examples of non-ionic water-soluble substances. Sodium chloride is particularly favourable by virtue of its properties and for reasons of economy. The solution of the water-soluble substance which accumulates during washing may be used for other purposes unconnected with the process according to the invention.

Salts which form hydrates and, in doing so, undergo a change in density, or which melt below 100° C in their water of hydration, which is the case for example with aluminium sulphate or sulphate hydrates, are not suitable. Additions of this kind cause the granulate to disintegrate.

Grinding of the water-soluble additive should be continued to substantially the same fineness as grinding of the active aluminium oxide. The constituents of the mixture may be individually ground in suitable mills such as ball mills, vibratory mills or jet mills. In any event, however, the mixture should be ground. Grinding is best continued until the residue on a 40$\mu$ screen is less than 20% and preferably less than 10%.

During granulation, addition of the water is adjusted so that at least 50% by weight of water is present, based on $Al_2O_3$. In addition to the water uptake of the active aluminium oxide, which binds some of the water to reform a hydrate, the soluble additive may also take up water and form in some cases saturated solutions. The heat effect accompanying hydrate formation of the $Al_2O_3$ and the heat of solution of the additive are opposed to one another. The solubility of the additive, and its dependence upon temperature, are both critical factors to the partial dissolution of the additive.

After the granulate has been stored under heat, the additive is washed out, preferably with fully desalted water. To this end, the granulate which still contains water is best introduced into one or more columns and washed out on the countercurrent principle. In cases where the additive is volatile, as for example in the case of urea or ammonium salts, complete washing out is unnecessary. After the washing water has been run off, the granulate is activated in a dry gas stream, preferably an air stream at temperatures in the range from 200° to 500° C and preferably at temperatures in the range from 300° to 400° C.

The total pore volume in cc/100 g may readily be determined by impregnation with water. Water is poured over a weighed quantity of the granulate and the vessel containing the granulate and water is then left standing until no more gas bubbles ascend. The water is then separated off by rapid filtration, the beads externally dried with filter paper and the water uptake determined by weighing. It is essentially the coarse pore volume which is increased by the process according to the present invention relative to the active aluminium oxide granulate. This pore fraction, which is in the micron-range, may be determined by mercury porosimetry, whilst the pore distribution in the fine pore fraction is obtained from the desorption curve after nitrogen adsorption. The porosity of the granulate is defined as $$\left(1 - \frac{\text{apparent density}}{\text{true density}}\right) \cdot 100$$

The active aluminium oxide granulates according to the invention may be used as drying agents or as catalysts and catalyst supports. In the first of these two applications, the higher porosity increases the rate at which water is taken up. So far as the second application, i.e. as catalysts and catalyst supports, is concerned, the higher pore volume is advantageous in most cases because more active material can be applied by impregnation and because the larger number of wide pores facilitates introduction of the reacting molecules.

The process according to the invention is illustrated by the following Examples:

EXAMPLE 1

The following starting materials were used:

1. Active aluminium oxide in powder form which had been produced in accordance with German Offenlegungsschrift No. 2,059,946, had a specific BET surface of 351 m²/g and an ignition loss of 5.4%, and showed only the weak interferences of chi-oxide in an X-ray photograph;

2. Sodium chloride (common salt containing 99.2% of NaCl).

The active aluminium oxide was ground for one hour in a vibratory mill and thereafter left a 9% residue on a 40μ screen. The ground product was then mixed with the sodium chloride in a ratio by weight of 1:1, and the mixture was ground for 2 hours in the vibratory mill. While water was sprayed onto it, the finely ground mixture was rolled on a granulating plate to form bead granulate with an average grain size of 4 mm. The granules, which contained approximately 39% of water (ignition loss at 750° C), were aged for 20 hours at 70° C, introduced into a column and washed out with an upwardly flowing stream of fully desalted water. When the water flowing off did not show any further chloride reaction, the water was drained off and the granulate blown dry with air. It was then introduced into a shaft furnace and activated with an air stream dried over silica gel and heated to 400° C. The granulate subsequently shifted down to 3 – 5 mm (the screen fraction of 3 – 5 mm diameter) had the following properties:

| | |
|---|---|
| Ignition loss at 1000° C: | 3.5% |
| Water uptake: | |
| static at approx. 10% relative humidity | 6.5% |
| static at approx. 60% relative humidity | 23.4% |
| Breakage resistance: | 16 kg |
| Total pore volume, as determined by impregnation with water | 75 cc/100g. |

An active aluminium oxide granulate prepared in exactly the same way, but without any addition of NaCl, had a breakage resistance of more than 20 kg and a total pore volume of 45 cc/100 g.

In addition, the true densities were determined in helium and the apparent densities in mercury, giving a porosity of 68.2% and an Hg pore volume (pore diameter of 150 A – 13 μm) of 25.5 cc/100 g for the product according to the invention, and a porosity of 58.4% and an Hg pore volume of 4 cc/100 g for the comparison product.

EXAMPLE 2

The same starting materials as in Example 1 were mixed in a ratio by weight of aluminium oxide to sodium chloride of 1:1.5. As in Example 1, the active aluminium oxide powder had been previously ground for 1 hour in a vibratory mill, and the mixture itself was ground for 2 hours.

A bead granulate 1 to 6 mm in diameter was produced in the same way while water was sprayed on. The granulate was stored in a closed drum for 24 hours at 60° C.

After rolling for 1 hour in a rotating drum, the granulate was introduced into a column and washed until free from chloride. Finally, the granulate was activated in a dry air stream at a temperature of 400° C. The fraction sifted down to 3 – 5 mm showed the following properties:

| | |
|---|---|
| Ignition loss: | 3.2% |
| Water uptake | |
| static at 10% relative humidity | 6.1% |
| static at 60% relative humidity | 24.2% |
| Breakage resistance | 7 kg |
| Total pore volume | 110 cc/100g |
| Porosity determined by impregnation with water | 77.5% |

What I claim is:

1. A process for producing active aluminum oxide granulate having a pore volume of greater than 50 cc/100 g and up to about 100 cc/100 g which comprises grinding a mixture of ground aluminum oxide powder with at least one ground additive selected from the group consisting of water-soluble salts and non-ionic substances which do not react with aluminum oxide, which are not hygroscopic at room temperature and below 60% relative humidity and which do not undergo phase transformation at temperatures of up to about 100° C., the ratio by weight of aluminum oxide to additive in said mixture being from about 90:10 to 30:70 and said grinding continuing until the mixture has a residue on a 40 μ screen of less than 20%, granulating the thusly ground mixture in the presence of at least 50% by weight of water, based on the aluminum oxide, ageing resulting granulate for at least 5 hours at 50° to 100° C., washing out said selective additive from the resulting aged granulate, drying the resulting washed granulate and activating the resulting dried granulate in a dry gas stream at a temperature of from 200° to 500° C.

2. The process of claim 1 wherein said additive is sodium chloride.

* * * * *